United States Patent
Motamed et al.

(10) Patent No.: US 6,930,795 B1
(45) Date of Patent: Aug. 16, 2005

(54) PRINTING METHOD AND APPARATUS HAVING MULTIPLE RASTER IMAGE PROCESSORS

(75) Inventors: Margaret Motamed, Foster City, CA (US); Ravi Someshwar, Foster City, CA (US); Chew Yan Kong, Mountain View, CA (US); Ravindranath Gunturu, Newark, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/514,465

(22) Filed: Feb. 28, 2000

Related U.S. Application Data

(63) Continuation-in-part of application No. 09/298,639, filed on Apr. 23, 1999.

(51) Int. Cl.[7] .............................................. G06F 15/00
(52) U.S. Cl. ...................... 358/1.18; 358/1.1; 358/1.9; 358/1.15
(58) Field of Search ................................. 358/1.18, 1.1, 358/1.9, 1.13, 1.16, 1.15, 294, 1.2; 399/1; 345/751, 853

(56) References Cited

U.S. PATENT DOCUMENTS

| | | | |
|---|---|---|---|
| 4,839,829 A | * | 6/1989 | Freedman .................... 347/51 |
| 5,287,194 A | * | 2/1994 | Lobiondo .................... 358/296 |
| 5,625,766 A | | 4/1997 | Kauffman |
| 5,652,711 A | | 7/1997 | Vennekens |
| 5,978,560 A | * | 11/1999 | Tan et al. ................... 358/1.15 |
| 6,049,390 A | | 4/2000 | Notredame et al. |
| 6,229,622 B1 | * | 5/2001 | Takeda ....................... 358/1.16 |
| 6,327,050 B1 | | 12/2001 | Motamed et al. |
| 6,411,396 B1 | | 6/2002 | Benson et al. |
| 6,441,920 B1 | * | 8/2002 | Smith .......................... 358/1.2 |
| 6,559,966 B1 | * | 5/2003 | Laverty et al. ............. 358/1.15 |

FOREIGN PATENT DOCUMENTS

| | | | | |
|---|---|---|---|---|
| EP | 0917044 | * | 5/1999 | ............. G06F 3/12 |
| EP | 0917044 A2 | | 5/1999 | ....................... 3/12 |
| EP | 0917044 A3 | | 5/2000 | ....................... 3/12 |
| WO | 97/06481 | * | 2/1997 | ....................... 3/12 |

\* cited by examiner

Primary Examiner—Twyler M. Lamb

(57) ABSTRACT

The invention provides a printing method and apparatus, comprising a software application that works with proprietary printing utilities, and that may include one or more additional software components for adding additional printing technology. The invention also comprises an automatic print load-balancing component in a centralized or distributed raster image processing (RIP) printing environment that enables faster system performance over single or multiple processors.

1 Claim, 3 Drawing Sheets

PRINTING METHOD AND APPARATUS HAVING MULTIPLE RASTER IMAGE PROCESSORS

This application is a Continuation-in-Part of co-pending U.S. application Ser. No. 09/298,639 filed on Apr. 23, 1999.

BACKGROUND OF THE INVENTION

1. Technical Field

The invention relates to the printing of images, which exist in a digital electronic format. More particularly, the invention relates to a printing method and apparatus that supports automatic print loading, cluster printing, and other optional components.

2. Description of the Prior Art

Every image that exists in a digital electronic format is made of picture elements. At some point, all such digital image data, whether expressed as vector format data or bitmap format data, must be rendered into pixels for display on a monitor or for printing on a printer. All images, therefore, have pixels as their base. Rendering, or translating the digital data into physical output, is the most important part of realizing such images. The term raster image processing (RIP) refers to the process of translating digital image data into physical visual images and graphics. FIG. 1 is a block schematic diagram showing a conventional raster imaging processor in which raster images are images composed of lines of pixels. In raster image processing, each horizontal line of bitmap image pixel information is referred to as a scan line or raster line. In FIG. 1, Postscript® lines 10 and/or digital RGB or CMYK pixels 12 are shown processed by associated RIPs 13–15 to produce information that results in a physical output 16.

The simplest output devices translate only one raster line at a time and then output that line to film, paper, or a monitor. FIG. 2 is an illustration of an image 20 and a single raster line 22 as processed by such device. More efficient RIP techniques analyze an image all at one time and convert the image information into visual output.

The RIP is a program that may be embedded in hardware or the may exist entirely in software. A hardware RIP is a computer which is attached to an output device and which is dedicated to translating digital image data for output. Image data is sent from a workstation to a computer that is attached to the output device. The hardware RIP program which resides in this computer interprets the image data and provides raw on/off instructions to the output device. The actual interpreter may be any program that translates image information in accordance with a known format. For example, the Postscript® interpreter manufactured by Adobe Corporation of Mountain View, Calif. is commonly used in raster image processing.

A software RIP performs many of the same functions as a hardware RIP. The software RIP is usually located at a workstation that is not necessarily dedicated solely to the RIP function. The software RIP interprets the digital image data and produces therefrom information that is required for the output device to function properly. A major disadvantage of software RIPs is that the workstation may not be configured to perform at speeds equal to a dedicated hardware RIP. Software RIPs are also presently less desirable for larger print facilities because such RIPs usually require a large amount of free hard disk space on the workstation. Such hard disk storage is necessary because all of the digital data that are processed must be saved before they are sent to the output device.

The RIPing process is complex and much of the output device rating is based upon the device's image processing speed. The speed of the interpreter or RIP is a major factor in the efficiency of the entire image reproduction process. Because of the dedicated computer, hardware RIPs are typically faster than software RIPs. Even so, it would be advantageous to provide improvements in RIP architectures that increase processing speed and efficiency.

SUMMARY OF THE INVENTION

The invention provides a printing method and apparatus, comprising a software application that works with proprietary printing utilities, and that may include one or more additional software components for adding additional printing technology. The invention also comprises an automatic print load-balancing component in a centralized or distributed raster image processing (RIP) printing environment that enables faster system performance over single or multiple processors.

The invention comprises the following features:

- Routes jobs to the most available printer based on color use, pages per minute, number of pages per said job, size, and number of copies for jobs already in a queue and number of copies of the job sent.
- Automatically can split job copies across specified number of printers meeting job criteria.
- Automatically can split a single copy that is a long job across more than one printer.
- Supports mixed groups of printers, wherein they do not all need to be the same make and model.
- Monitors the print job status and can redirect the job if an error occurs.
- Supports job scheduling by allow a user to specify job priority, with password required for rush jobs, and to specify job rip and print scheduling in advance.
- Supports specified non-proprietary black and white printers.

Other aspects and advantages of the invention will become apparent from the following detailed description in combination with the accompanying drawings, illustrating, by way of example, the principles of the invention.

DETAILED DESCRIPTION OF THE INVENTION

Overview

Description

Figure 1:
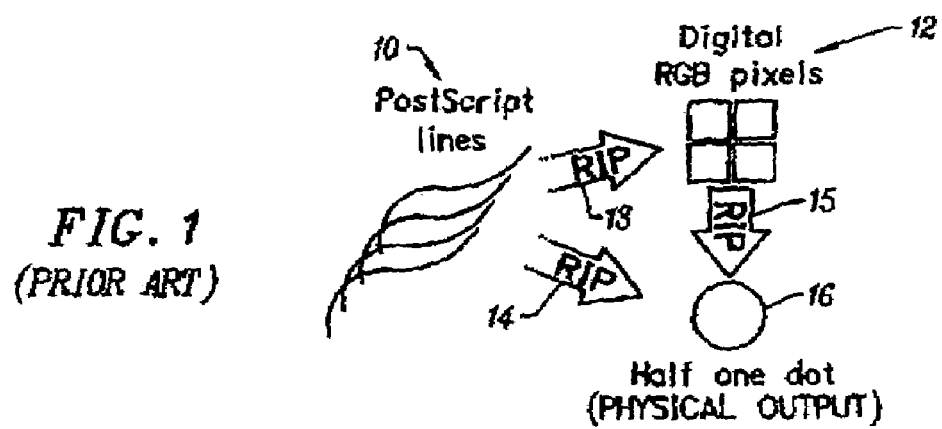
FIG. 1 is a block schematic diagram of a conventional raster image processing system.
Figure 2:
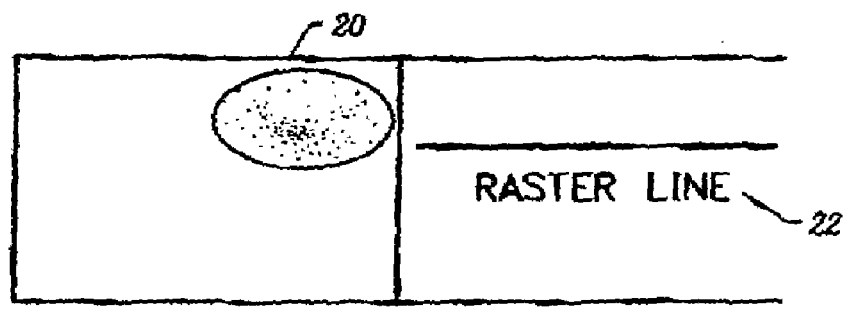
FIG. 2 is a drawing which illustrates the processing of a single raster image line.

The invention claimed herein provides a printing method and apparatus, comprising a software application that works with proprietary printing utilities, and that may include one or more additional software components for adding additional printing technology. The invention also comprises an automatic print load-balancing component in a centralized or distributed raster image processing (RIP) printing environment that enables faster system performance over single or multiple processors.

It is noted that when the claimed software application is linked to and ships with one or more additional printing software components, the collection can be viewed as a suite.

It is noted that the claimed invention operates in a distributed RIP environment, as well as a centralized RIP environment.

The preferred embodiment comprises, but is absolutely not limited to, the following features:

Load-Balancer: Automatic routing of jobs to the most available printer based on factors, such as, for example, color or black and white, pages per minute rates, the number of pages in a job, size of job, and copies for both the jobs already queued to print and the job to be sent. The decision is made to minimize the time to completely print out the job;

Load-Balancer: Automatic splitting of sets across more than one engine (e.g. copies 1–10 go to a first engine, and copies 11–20 go to a second engine). The goal is to route the job such that it will complete printing as soon as possible;

Load-Balancer: Automatic splitting of a single, long job, copy across more than one engine. The goal is to route the job such that it will complete printing as soon as possible;

Redirect On Error: Automatic redirection of a print job when a printer error occurs;

Job Scheduling: Specify job priority and time; and

Support for specified non-proprietary black and white printers, as well as support for mixed groups of printers, wherein they do not all need to be the same make and model.

The preferred embodiment is designed for high-volume corporate, CRD, and print-for-pay environments. In corporate environments, a proprietary linkable utility reports back the job status and printer choices, and in CRD and print-for-pay environments, another proprietary linkable utility provides a comprehensive view of printer and job status.

The preferred embodiment allows an administrator to designate a group of printers that can be used for hybrid printing (color and B&W), job load-balancing (1 copy, long job), or set load-balancing (many copies). The invention appears as a printer on a users network and has a specific driver and PPD associated with it. From the users perspective, printing to the preferred embodiment load-balancing printer follows the same process as printing to any other printer on a network.

When the claimed application software starts, it advertises itself as a virtual printer on the network. When a user prints to the virtual printer from their workstation, the job is printed to the claimed application software. During the decision phase, the claimed invention determines an optimum printer choice(s) and forwards the job accordingly. The preferred embodiment reports engine choices back to the user via the two proprietary print utilities mentioned herein above.

Figure 3:
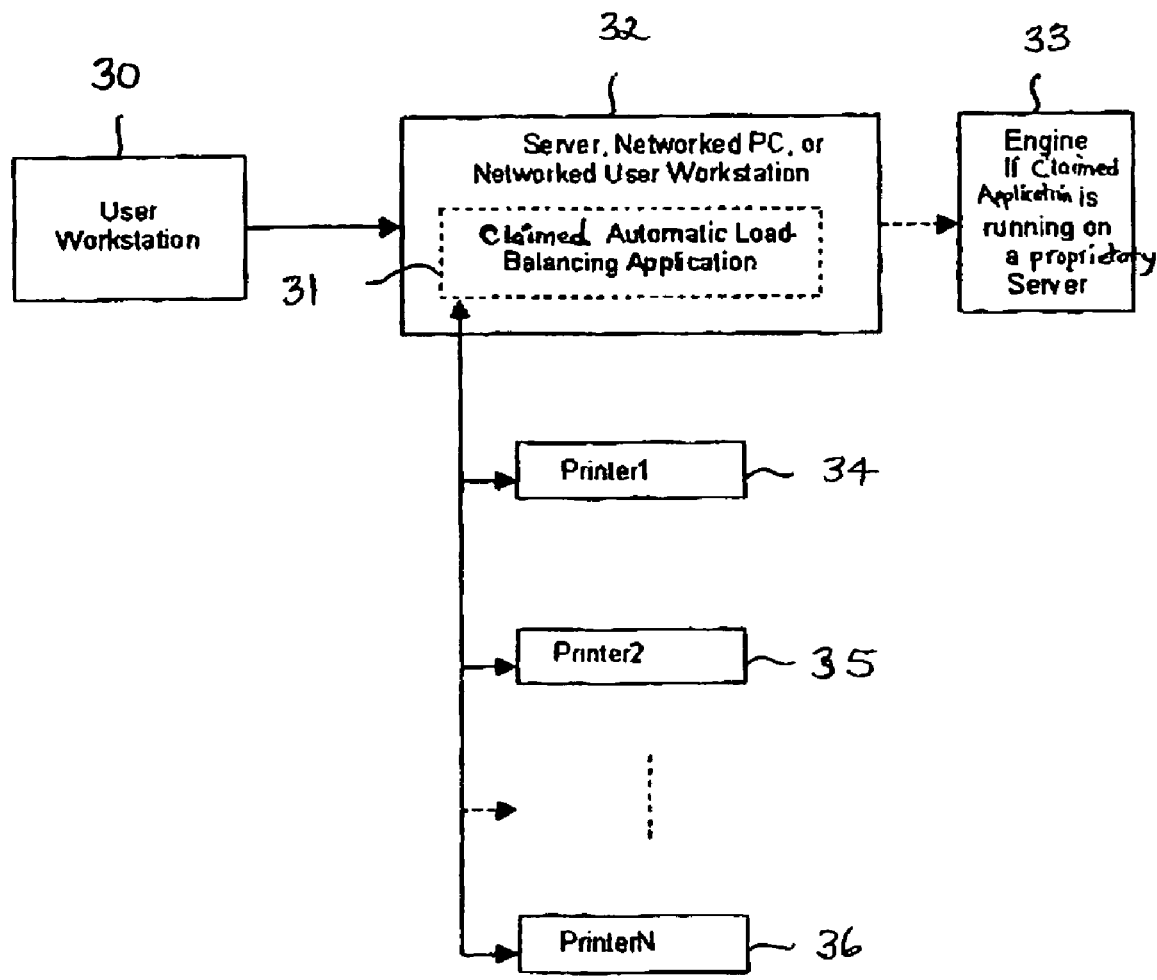
FIG. 3 is a block schematic diagram of the components of a preferred embodiment according to the invention.

FIG. 3 displays a path a print job takes from a users workstation 30 to a final printing on a network connected engine according to the preferred embodiment of the invention. The workflow from the user perspective is fairly simple. The user sets appropriate PPD options for a print job using a proprietary driver utility 30. To print using the claimed invention, the user selects the virtual printer application 31 from their application. The virtual printer 31 resides on a server, networked PC, or networked user workstation 32. In an optional embodiment, if the claimed application resides on a proprietary server, then the job gets sent to a proprietary engine 33.

Once the print job has been sent to the claimed application 31, the preferred embodiment of the invention makes all load-balancing decisions and sends the job on to the appropriate server/engines for printing 61–63. Once the job has been sent out by the claimed application, the user determines to which server(s)/engine(s) their job has been sent using proprietary utilities. If an error occurs that requires the job to be redirected according to the error protocol of the preferred embodiment, the proprietary utilities reflect the server/engine changes to the user.

Figure 4:
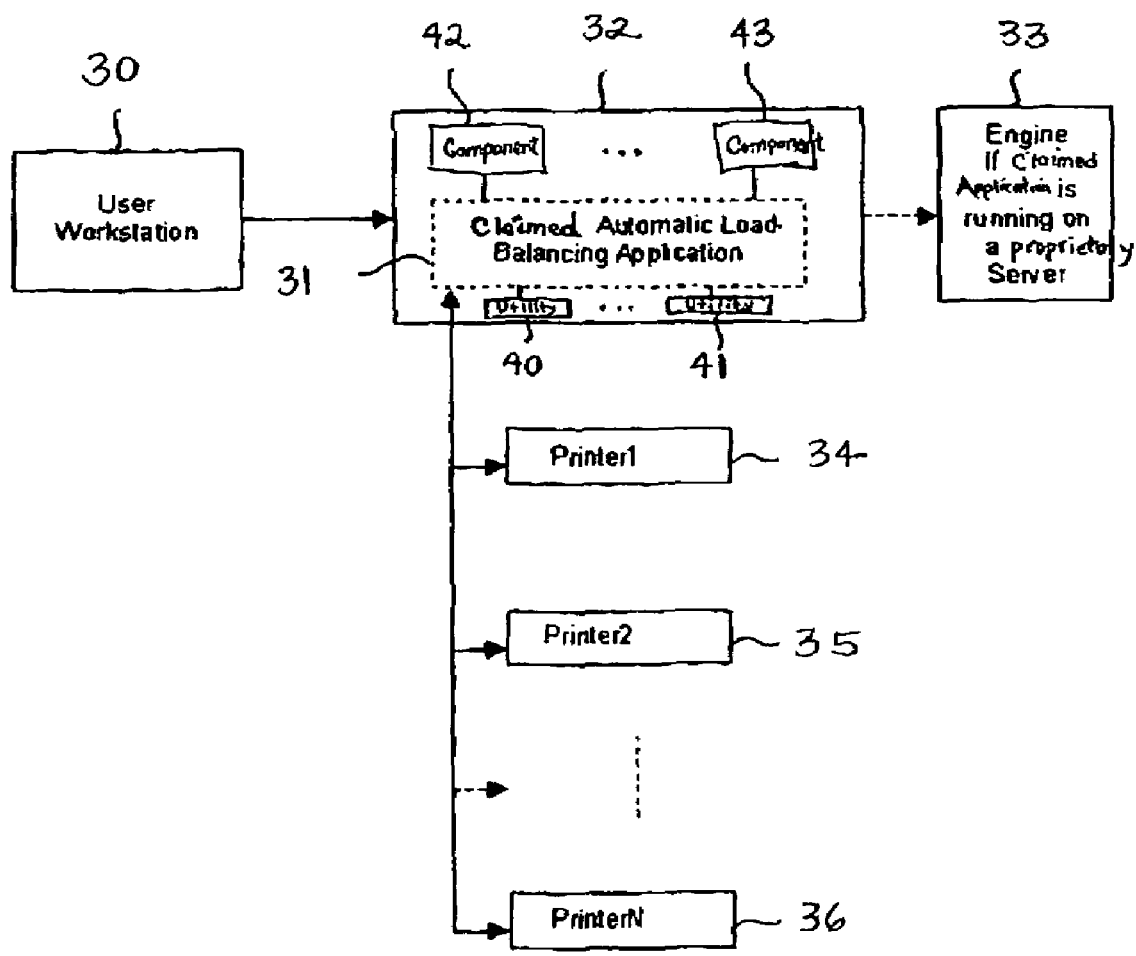
FIG. 4 is a block schematic diagram of the components of a preferred embodiment according to the invention.

FIG. 4 is a block schematic diagram of the components of a preferred embodiment according to the invention, similar to FIG. 3. The claimed application 31 is linked to proprietary utilities 40–41, and linked to component printer software 42–43 to allow some or all of the load-balancing.

Affected Utilities.

The preferred embodiment requires no changes to proprietary setup software used with a proprietary server.

In the preferred embodiment, proprietary utilities log into the application in an identical manner to logging into the proprietary server. Jobs sent to the application are displayed in a utility's active jobs sections queue. The application is responsible for listing printers the state of and where the pieces of a load-balanced print job has been sent. Also, the utility's menu setup option allows an administrator to access the application's setup interface.

In the preferred embodiment, job logs for the claimed invention and proprietary servers are displayed through the utilities. For each claimed automatic load-balanced job, the job log lists the job and all printers that received pieces of the job. For each proprietary server included in the automatic load-balancing group, the job log lists only the piece of the job that was sent to that server.

In the preferred embodiment, a proprietary driver lists all PPD options that can be set on the claimed application. Changes made to PPD options through the driver are applied on a per-job basis.

Functional Requirements

A preferred embodiment of PPD Options.

In the preferred embodiment, PPD options that are specific to the claimed application are all detected by the driver utility. The preferred embodiment comprises, but is not limited to the following PPD options.

Print Settings. Selections comprise, but are not limited to:
Rush jobs which causes job to be printed as fast as possible, even if the engines in the group do not necessarily support all selected PPD options. A message dialog can appear informing the user of which PPD options are not supported.

Exact Match causes jobs only to be sent to engines within the selected group supporting the selected finishing equipment, including, for example, color vs. black & white, paper size, and the like. The user is informed if no match is mae and reports the specific PPD choices that are not supported in the printer pool. A default PPD option is available.

Copy Split. If print job contains multiple copies, indicates whether to split the number of copies over a number of engines, or simply to print all copies on one engine. The PPD option is related to the Maximum Number Of Engines Per Job PPD option herein below. Selections comprise, but are not limited to:

Yes. Splits copies across engines. Causes the set of copies to be split and printed across all of the engines included in a selected printer group. Limits the set split to the number of printers specified in Maximum Number Of Engines Per Job PPD Option.

No. Causes all copies in the set to be printed to a single engine from a selected printer group. Default PPD setting. Default goal is to find the particular engine that prints the job the fastest.

Long Job Split. If print job consists of one copy of a file, indicates whether the file should be split to print across a number of engines, or simply to print all copies to one engine. Related to the Maximum Number of Engines Per Job PPD options. Selections comprise, but are not limited to:

No. Prints a long job on one engine. Causes the entire file to be printed from a single engine regardless of page length. Default PPD setting. Default goal is to find the one engine that will print the job the fastest.

Yes. Split long job across engines. If a file is greater than or equal to the number of pages set in application's setup, then the file is split up and printed among the different engines in the selected printer group. Restricted to the value set in the Maximum Number of Engines Per Job PPD.

Long Job Page Split Minimum. The Long Job Page Split Minimum field determines how long a single job must be before the application will split the single job. This value only applies to long jobs that have been printed as a single copy. The default value is 200. It is noted that Page Split Minimum is a claimed application setup option, not a PPD option.

Maximum Number of Engines Per Job.

Maximum number of engines/printers over which a job can be load-balanced comprise, but are not limited to: 2, 3, 4, . . . , 24. PPD option applies to Set Split and Long Job Split PPD options cited herein above.

Reroute On Error.

Yes. Allows an administrator to specify to automatically re-route a print job when an engine error based on Error Recovery Timeout described herein below occurs.

No.

Error Recovery Timeout.

Error Recovery Timeout is related to Reroute On Error PPD option described herein above. A timeout period is set in the claimed application and is used when an engine failure such as, for example, a paper jam error, out of paper error, and the like occurs. The purpose of the timeout period is to cause the claimed application to wait a period of time specified by the administrator before redirecting a job to another load-balanced printer. The timeout period allows the engine operator time to correct the error condition before the job is redirected. It is noted that the Error Recovery Timeout is an application setup option, not a PPD option.

Priority.

Normal. A job is RIPed and printed in the order received. Default PPD setting.

Fastest. A job is moved to the front of a load-balancing queue for processing. Fastest priority requires an administrator password to be entered.

Background. A job always lets other jobs move ahead of a in the queue (nice mode), and is only processed in deadtime (background), or when no other jobs are waiting.

Job Scheduling. The Job Schedule PPD allows a user to set a time and date that the job gets printed. The claimed application holds the print job until it is time to print. At that time, the job is inserted into a load-balance queue according to its priority described herein above.

Application Error Recovery.

In the preferred embodiment, and for proprietary servers loaded with the correct system software, errors detected on the claimed application jobs are passed back from the proprietary server to the claimed application. The error protocol is as follows:

Error Types.

Engine problem. Engine problem comprises, but is not limited to paper jams, out of toner, out of paper, or any engine error code requiring attention. Engine problems are redirected according to the Error Protocol described herein below after Error Recovery Timeout has expired.

RIP related error.

Error Protocol.

Every time a claimed application's sent job's status changes within a proprietary server, the proprietary server sends the status to the claimed application. If a job's status is equal to Error as described herein above, the following steps apply:

1. The claimed application cancels the job on the printer.
2. The claimed application excludes problem printer/engine from the list of available resources.
3. The claimed application redirects print job to a new printer from the selected group.
4. If claimed application is unable to redirect the job because the printer group contains only one engine, or because no other engines meet job's requirements, the job is canceled and the user is notified.

It is noted that error redirections are given priority. The claimed application completes load-balancing the current job and redirects the problem job before moving to the next job in its queue.

It is noted that the claimed application can further split a set load-balanced job (multiple copies) during redirection, but does not split a job load-balanced (1 copy long job) during redirection.

Application Workflow.

In the preferred embodiment, the workflow from the user perspective is fairly simple. The claimed application is set up on a user's workstation in the same manner that a proprietary server is set up on the user's workstation. The user sets the appropriate PPD options as described herein above for the job using the driver utility as described herein above. To print to the claimed application, the user selects the virtual printer associated with the claimed application from their application.

Once the print job is sent to the claimed application, the claimed application makes all load-balancing decisions and sends the job on to the appropriate server/engines for printing. Once the job is sent out by the claimed application, the user determines to which server(s)/engine(s) the job is sent by using a proprietary utility(s).

If an error occurs the job is required to be redirected according to the error protocol described herein above, and the proprietary utility(s) reflects the server(s)/engine(s) changes to the user.

Job Flow.

In a preferred embodiment, the claimed application software is installed on a networked PC, which meets appropriate system requirements. 1. When the claimed application is selected as the printer, a file is sent to the claimed application. The claimed application has a filter which parses the file. According to certain settings in the job PPD, then associated decisions are made during parsing. After optimum print job balancing is determined, the job is forwarded over the network to the designated printer(s).

Installation and Setup

In the preferred embodiment, the claimed application software confirms that the assigned proprietary printers are the correct engine and revision. Administrative setup options are a part of the claimed application software.

Information required for setting up the claimed application for automatic load-balancing in a preferred embodiment are:

IP Addresses for Engines 1 thru N (FIG. 3, 34–36).
Device type for attached proprietary servers.
Optional external collator software.
Optional external scanner setup.
Claimed application printer groups setup.
Job ticket defaults.
Error Recovery Timeout.

It is noted that at installation, the claimed application in the preferred embodiment is placed in the networked PC or proprietary server's start-up group. The claimed application starts up when the PC or proprietary server is booted.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A raster image processing (RIP) software application adapted for use on a networked computer coupled to a plurality of networked printers, the software application adapted to:

receive a print job;

parse the print job into one or more print pieces;

load balance the print pieces among the printers based on color use and print speed; and provide a list of the printers that received the print pieces.

* * * * *